Jan. 28, 1941. J. L. PEAVEY 2,230,012
GLARE SHIELD
Filed April 11, 1939 2 Sheets-Sheet 1
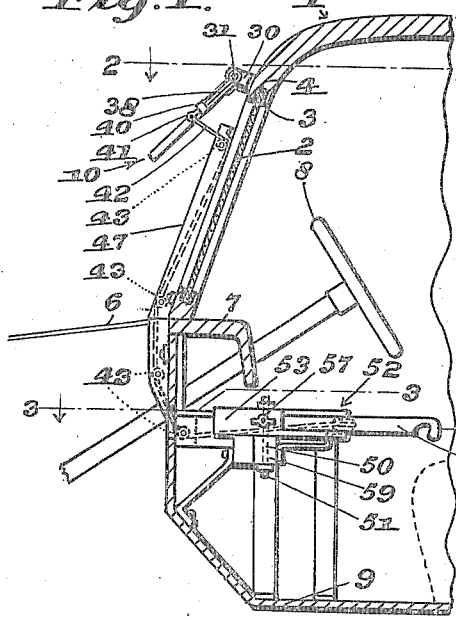
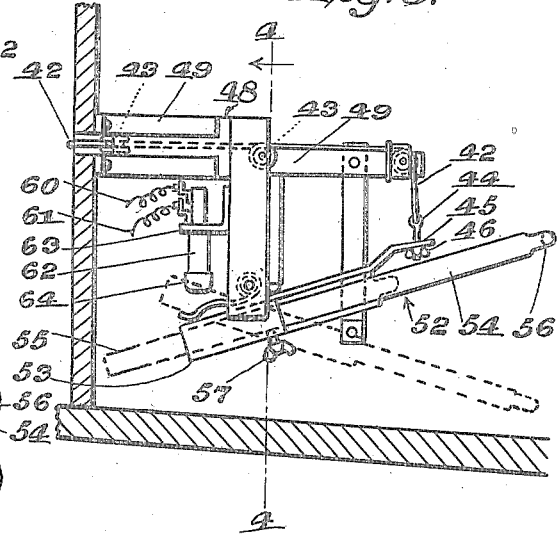
Inventor
Joseph L. Peavey.
By Munn, Anderson & Liddy
Attorneys

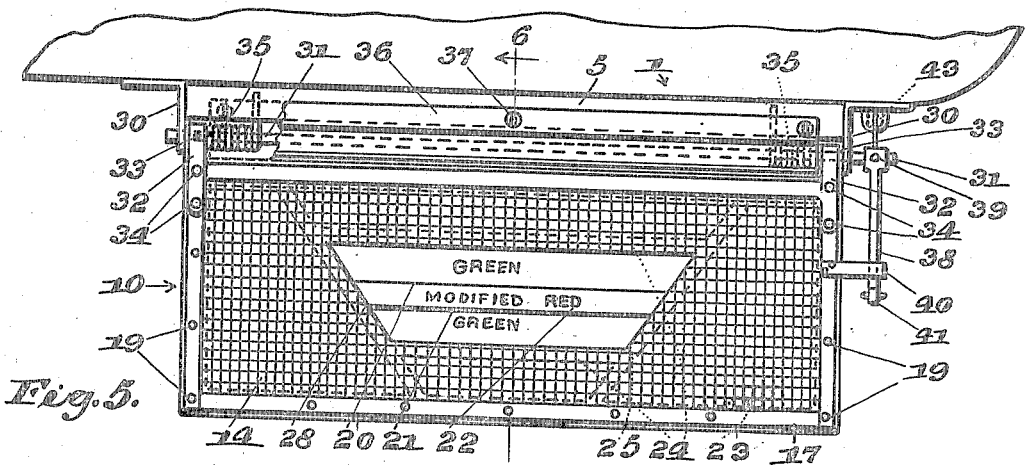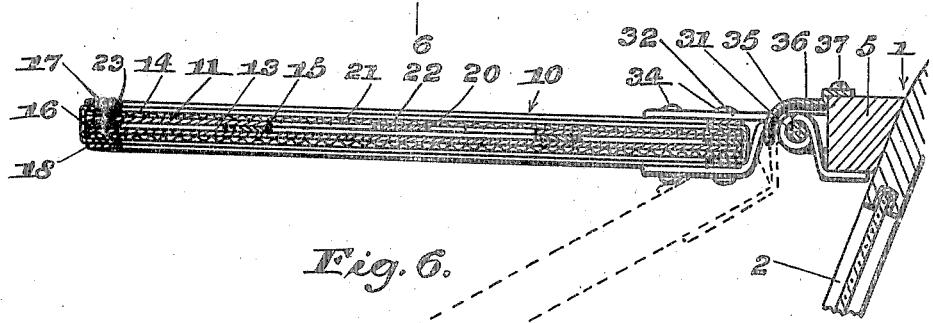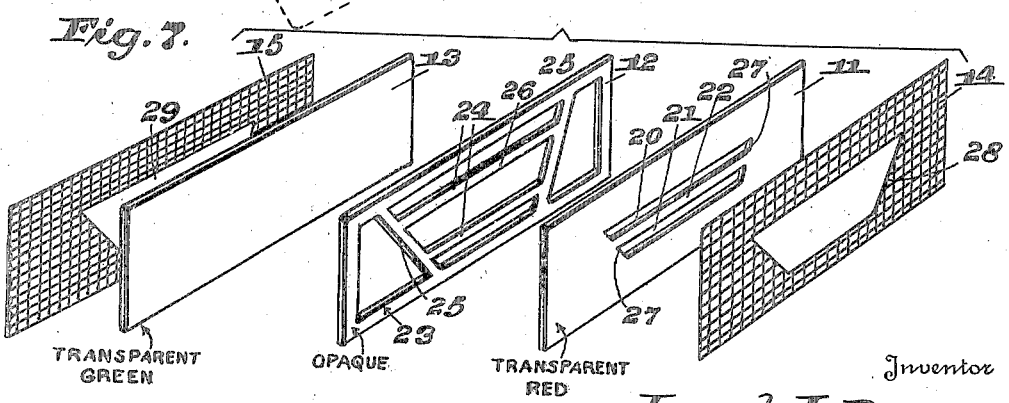

Patented Jan. 28, 1941

2,230,012

UNITED STATES PATENT OFFICE 2,230,012

GLARE SHIELD

Joseph L. Peavey, Meridian, Miss.

Application April 11, 1939, Serial No. 267,257

6 Claims. (Cl. 296—97)

This invention relates to improvements in glare shields. It is intended primarily for use on motor vehicles, and more specifically on passenger automobiles and trucks. The reduction and elimination of headlight and sun glare have presented a problem for which a solution has been sought for a long time.

It is deemed unnecessary to enlarge upon the remedies that have been put into practice, it being thought sufficient to state that any arrangement which will reduce the glare comes nearest to meeting current requirements. It is toward the latter end that the instant invention has been devised, a particular advantage of it being to enable the driver of the vehicle to move the glare shield across and out of his line of vision without having to alter the position of his head or to take his hands from the steering wheel. With this preamble in mind the outstanding objects of the invention are as follows:

First, to provide a glare shield for motor vehicles which is ordinarily stationed in a position out of the normal range of vision of the driver, but is movably mounted and so connected with a knee-lever as to respond to a lateral knee-pressure to bring said shield down across the line of vision and so reduce or eliminate headlight or sun glare.

Second, to provide a glare shield of the above character wherein the motion of the knee-lever, or some associated movable part, is also utilized in operating a dimmer switch for the headlights of the motor vehicle carrying the glare shield, so that the driver is not only shielded from the oncoming glare but also spares the oncoming driver the distress of having to look through an opposing glare.

Third, to provide a glare shield which is operable without the necessity of the driver altering the position of his head, removing his foot from the accelerator or pedal or his hands from the steering wheel.

Other objects and advantages will appear in the following specification, reference being had to the accompanying drawings, in which:

Figure 1 is a sectional view of a portion of a motor vehicle, illustrating the embodiment of the glare shield.

Figure 2 is a horizontal section taken on the line 2—2 of Fig. 1.

Figure 3 is a horizontal section taken on the line 3—3 of Fig. 1, especially showing some of the mechanism of the glare shield in plan.

Figure 4 is a cross section taken on the line 4—4 of Fig. 3.

Figure 5 is a plan view of the screen.

Figure 6 is a cross section of the screen and some of the adjacent parts, taken on the line 6—6 of Fig. 5.

Figure 7 is a perspective view showing some of the elements of the screen in expanded relationship to each other so as to facilitate an understanding thereof.

In Fig. 1 the motor vehicle is generally designated 1. This vehicle will be recognized as being of the ordinary passenger automobile type, but as already suggested, the invention is not confined to use on such an automobile because it is applicable to any kind of moving vehicle wherein the driver is likely to become confused by the glare of either oncoming headlights or sunlight. With these reservations in mind the description is confined to the application of the invention to an ordinary passenger automobile.

The latter has a windshield 2 which is set in the window opening 3 in any known way. The part designated 4 in Fig. 1 may be regarded as the window-frame, but actually the latter is supplemented by a cross cleat 5 (Fig. 6) which is herein used as the actual mount for the movable screen. Inasmuch as it would be possible to attach the screen directly to the part 4 as in Fig. 1, it is desired to have it understood that either or both of the elements 4, 5 are herein regarded as the window-frame.

The vehicle 1 also includes the cowl 6 (Fig. 1), instrument-board 7, steering wheel 8 and floor-boards 9. Attention is first directed to the movable screen generally designated 10 (Fig. 5). This screen is a laminated structure (Fig. 7). It consists of a pane 11 of transparent red material, a mask 12, a pane 13 of transparent green material and a wire back and front 14, 15. These elements are closely superimposed (Fig. 6), being marginally bound at 16 and then faced with metal frames 17, 18 at the front and back, the whole assemblage then being riveted at 19 (Fig. 5) to produce a tight pack. It is this structure which comprises the screen 10.

Ordinarily the panes 11, 13 (Fig. 7) are made of red and green Celluloid. It is readily conceivable however that they might comprise glass or some other suitable colored transparency. According to the present arrangement the red pane 11 would be on top in Fig. 5. In other words, it is to the outside and consequently at the front. The green pane 13 is in back next to the driver. The pane 11 is slotted twice at 20, 21, to provide a red band 22.

If the reader will consider the superimposition of the red pane 11 upon the green pane 13 he will understand that in looking toward the light through the slots 20, 21, he will see the latter in pure green color. In looking through the composite panel around the slots 20, 21 he will see the light in modified red. The green of the pane 13 will deepen the red of the pane 11 considerably but the red predominates, and the presence of the band 22 across the green pane 13 provides a stripe of modified red directly in what is now identified as the sight field.

This side opening primarily comprises the slots 20, 21 and the medially situated band 22. The color seen through the slots 20, 21 is green, as already stated (Fig. 5) while the band 22 provides a medial strip of modified red. This arrangement is of the utmost utility in screening out the glare of oncoming headlights or of other confusing light rays.

The mask 12 (Fig. 7) comes between the panes 11, 13. Said mask is desirably cut out according to the general arrangement shown. This cutting produces a margin 23, a pair of cross bands 24 and a pair of upwardly diverging connectors 25. The mask 12 is made of opaque material, and if so desired may be blackened either in whole or in part.

The slot 26, produced by the appropriate spacing of the cross bands 24 is as deep as the spacing between the remote margins of the slots 20, 21, in the pane 11. In other words, the slot 26 is a direct aid in outlining the sight field which embraces the slot 20, 21, and the band 22.

Said slots are cut at angles 27 at their lateral extremities to match the pitch of the connectors 25. The color of the screen panels around the sight field is the same modified red as the band 22. Obviously no color is seen where the margins and other parts of the mask 12 come, and it is the opaqueness of these parts which make a large contribution toward guarding the eyes of the driver. His line of sight is centered in the previously mentioned sight field, the immediately surrounding cross bands 24 and connectors 25 preventing any possibility whatsoever of a reflection of light back into the driver's eyes. The latter is thus provided with a two-tone sight field surrounded by an opaque frame.

Said sight field is further identified by the appropriately shaped openings 28, 29 in the front and back wires 14, 15. These socalled wires are nothing more than ordinary woven wire screens, approximately of ¼ inch mesh. Their sole purpose is to protect the colored panels, and in the event of their being Celluloid, to guard them against buckling.

A pair of rigid brackets 30 (Fig. 5) provides the support for a shaft 31. This shaft is turnable in the brackets, and it has a pair of arms 32 secured to it at 33, said arms in turn being secured to the screen 10 at 34. Springs 35 are so mounted as constantly to tend to turn the screen in the up-position (full lines Fig. 6). To this end the convolutions of the spring are fitted upon the shaft 31 (Fig. 5), the ends of the spring being so anchored as to produce the result named. A shield 36 curves over the shaft and springs (Fig. 6) being secured to the cleat 5 at 37 for support.

A stem 38 (Fig. 5) is secured to the shaft 31 at 39 and it extends in parallelism to the screen 10 for about half the depth of the latter, a cleat 40 being carried by the screen frame to afford a rigid connection for the stem near its free end 41. The latter has one end of a flexible element 42 secured to it (Fig. 1).

This element may comprise a suitable cord or a chain. It is trained over a suitable number of pulleys 43, or equivalent guides, its inner end terminating at an eye bolt 44 (Fig. 3) which is adjustable in respect to an extension 45 by means of a thumb screw 46. The externally exposed part of the flexible element 32 goes through a tube 47 (Fig. 1). This tube stands beside the window-opening 3, and it is so made as to minimize the chance of water entering.

Consideration is now given to the actuating means for the screen 10. This actuating means is commonly designated 48. It comprises a framework 49 which has an altitude of approximate knee-height. This frame-work is variously shaped in order to accommodate the moving parts of the actuating means 48, this shaping including the provision of suitable supports for those of the pulleys 43 which are connected within its confines.

One part of the framework 49 provides a support for an upright shaft 50, the ends 51 of which are in the form of pintles which are turnably set in holes in the framing. Said shaft is desirably square so as to more advantageously enable the securement of the knee-lever 52. Said lever comprises the pocket portion 53 and the extensible portion 54. It is the pocket portion 53 which is actually secured to the shaft 50, the portion 54 being extensible from the dot and dash line position 55 (Fig. 3) to the full line position there shown.

Use is made of the handle 56 in pulling the extension 54 out. A set screw 57 in the side of the pocket portion 53 is then used to secure the extension. The operator is intended to press against the side of the extension 54 so as to move it from the full line position (Fig. 3) to the dotted line position.

When in the former position the lever 52 engages one or more bumpers 58. These are carried by a part of the framework 49 and they usually consist of rubber. Springs 59 are carried by the pintles 51 and their ends are so anchored that the springs tend to normally keep the knee-lever 52 in the full line position (Fig. 3). It is thus against the tension of the springs 59 (Fig. 3) and 35 (Fig. 5) that the screen 10 is moved from its full line position to the dotted line position (Fig. 6), and it is these same springs which return the respective parts to their starting positions.

Provision is also made for guarding the driver of the oncoming vehicle against the possible glare of the headlights of the instant vehicle. The headlights of the latter are not illustrated, nor is the lighting circuit thereof, but in Fig. 3 the wires 60, 61, are to be considered as parts of the lighting circuit. These wires lead to the appropriate internal parts of a dimmer switch 62. This switch is mounted on a bracket 63 (Fig. 3) at a convenient place on the framework 49. It has a movable cap 64 which is adapted to open and close the switch.

The dimmer switch occupies the closed position when the knee-lever 52 is in its full line position. This maintains the lighting circuit at full strength. But when the knee-lever is moved to the dotted line position so that the movable cap 64 is depressed, the resistance in the dimmer switch 62 is introduced into the circuit so as to diminish the current to the headlights. This lowers their brilliancy. The operation is readily understood. Under ordinary conditions the screen 10 is held in the up-position shown in full lines in Fig. 6. This is accomplished by the springs 35 (Fig. 5). Thus under ordinary circumstances the screen 10 is held out of the normal line of vision of the driver.

Should the latter approach a source of glaring light he is able to instantly bring the screen down across his line of vision. He does this by pressing to the left against the knee-lever 52 so that the latter is moved to the dotted line position (Fig. 3). It is unnecessary for him to remove his hands from the steering wheel 8, consequently the danger of throwing the car out of control by having to reach for some fixture with which to manipulate the screen, is totally eliminated.

It is not even necessary for the driver to alter the position of his head so as to bring the glare shield into proper range. By appropriately regulating the pressure of his knee against the lever 52 he can bring the previously mentioned sight field more or less directly across his line of vision, enabling him to screen out the glare either through the green transparency seen through the slots 20, 21, or through the modified red seen across the band 22. The screen 10 remains in the protecting position for the duration of the knee pressure against the lever 52 and when the latter is released the screen automatically returns to its inoperative position.

Reverting to the wire mesh 14, 15, previously described as guarding the Celluloid against buckling, it is desired to state that a further important function of the screens 14, 15 is to protect panes of glass in the event of these being substituted for the Celluloid. Even in the event of breakage the wire mesh would keep the pieces from falling out.

The foregoing description is predicated on the location of the screen 10 on the left side of the windshield. This is due to the prevailing types of automobiles which are driven from the left side. But it is desired to state that the screen is adaptable to the right side for those vehicles which have a right hand drive and by an extension of the idea twin screens may be provided, one for each side of the windshield.

An arrangement such as this would accommodate a rider on the front seat to the right of the driver. A duplicate knee lever 52 and appropriate connections would be provided so that the extra or auxiliary screen would be subject to operation by the rider at will.

I claim:

1. In a glare shield for motor vehicles, a screen consisting of superimposed panes of differently colored transparent material, one of the panes being slotted, said slot in said one pane and the contiguous superimposed portions of both panes providing a sight field respectively to filter the color of the unslotted pane and the modified color of the slotted pane.

2. In a glare shield for motor vehicles, a screen consisting of superimposed panes of differently colored material, one of the panes having spaced apart slots defining a medial band, said slots in said one pane and the superimposed portions of both panes along said band providing a sight field respectively showing the color of the unslotted pane through said slots and the modified color of the slotted pane through said medial band.

3. In a glare shield for motor vehicles, a screen consisting of two panes of differently colored transparent material, one of the panes being slotted, said slot in said one pane and the contiguous superimposed portions of both panes providing a sight field respectively showing the color of the unslotted pane through said slot and the modified color of the slotted pane through said slotted pane, and an opaque mask interposed between said panes, bounding said sight field to prevent an inadvertent reflection of light.

4. In a glare shield for motor vehicles, a screen consisting of two panes of colored transparent and flexible materials one of the panes being slotted, said slot in said one pane and the contiguous superimposed portions of both panes providing a sight field respectively showing the color of the unslotted pane through said slot and the modified color of the slotted pane through said slotted pane, an opaque mask situated intermediately of said panes, bounding said sight field and distinguishing the latter from the rest of the panes, reinforcing means against at least one of the panes, said means having an opening matching the sight field, and means binding the panes, mask and reinforcing means in a tight pack.

5. In a glare shield for motor vehicles, a screen consisting of two panes of colored transparent and flexible materials one of the panes being slotted, said slot in said one pane and the contiguous superimposed portions of both panes providing a sight field respectively showing the color of the unslotted pane through said slot and the modified color of the slotted pane through said slotted pane, reinforcing means against at least one of the panes, said means having an opening matching the sight field, means binding the panes, mask and reinforcing means in a tight pack, and an opaque mask between said panes, being slotted to provide parallel cross bands having diverging end connectors, said bands and connectors marginally framing said sight field and distinguishing said field from the rest of the screen.

6. A glare shield for a motor vehicle having a windshield, means movably supporting the glare shield across the top of the windshield, said means including a shaft by which the glare shield is carried, a stem secured to the shaft for its turning, a cleat jutting out from the glare shield, making connection with the stem substantially at its free end to aid in moving the glare shield when the stem is shifted, a flexible element attached at one end to the free end of the stem and extending off therefrom, a lever for operating the glare shield, comprising a pocket portion having an extension to which the other end of the flexible element is attached, an extensible portion telescopically carried by the pocket portion, being variably extensible to secure various leverages by action of the driver's knee, and a frame built up from the floor of the vehicle to insure its solidity, said pocket portion being pivoted upon said frame for convenient access by said driver's knee.

JOSEPH L. PEAVEY.